United States Patent [19]
Imao et al.

[11] Patent Number: 6,026,945
[45] Date of Patent: Feb. 22, 2000

[54] AUTOMATIC OPERATING APPARATUS FOR A FRICTION CLUTCH

[75] Inventors: Toshio Imao; Eiji Takeyama, both of Nagoya, Japan

[73] Assignee: Aichi Kikai Kogyo Kabushiki Kaisha, Nagoya, Japan

[21] Appl. No.: 09/222,760

[22] Filed: Dec. 30, 1998

[30] Foreign Application Priority Data

Jan. 12, 1998 [JP] Japan .................................. 10-018155

[51] Int. Cl.[7] ............................ F16D 25/12; F16D 29/00; F16H 27/02; F03G 1/00
[52] U.S. Cl. ..................... 192/91 R; 74/89.14; 74/100.1; 185/40 R; 192/84.6; 192/90; 192/30 W
[58] Field of Search ................................ 192/84.6, 91 R, 192/91 A, 90, 30 W; 74/100.1, 89.14; 185/40 R

[56] References Cited

U.S. PATENT DOCUMENTS

| | | | |
|---|---|---|---|
| 4,852,419 | 8/1989 | Kittel et al. | 192/84.6 X |
| 5,010,993 | 4/1991 | Carneiro et al. | 192/84.6 |
| 5,421,440 | 6/1995 | Kamagai | 192/90 |
| 5,680,916 | 10/1997 | Borschert et al. | 192/84.6 X |
| 5,758,758 | 6/1998 | Friedrich | 192/91 R |
| 5,839,561 | 11/1998 | Koda et al. | 192/90 |

FOREIGN PATENT DOCUMENTS

| | | |
|---|---|---|
| 0260399 | 3/1988 | European Pat. Off. . |
| 2564999 | 11/1985 | France . |
| 3706849 | 9/1988 | Germany . |
| 4138625 | 5/1993 | Germany . |
| 4433824 | 3/1996 | Germany . |
| 2161237 | 1/1986 | United Kingdom . |

*Primary Examiner*—Rodney H. Bonck
*Attorney, Agent, or Firm*—Dennison, Meserole, Scheiner & Schultz

[57] ABSTRACT

An automatic operating apparatus for a friction clutch is disclosed which apparatus performs the disconnection of the clutch of a transmission by the assistance of the accumulated load in a load accumulator which can perform the accumulation and the release of the load by a simple mechanism. In the automatic clutch operating apparatus having a reducer 9, 13 to reduce the forward rotating force of a motor 1 and a movement converter 10, 12 to make a piston rod 4a of a hydraulic master cylinder 2 move in the axial direction so as to disconnect the friction clutch, a link mechanism is constructed for accumulating the loads due to the rotating force of the motor 1 and the repulsive force of the clutch spring in the load accumulator 16, 18 when the motor 1 is rotated backward to connect the friction clutch and for releasing the accumulated loads when the motor 1 is rotated forward to disconnect the clutch. The link mechanism is formed as a toggle joint including a crank arm 10, a piston rod 4a, a link 21 which is rotatably connected with a load accumulator 16, 18 through a first connecting portion 20, and a second connecting portion 12 to rotatably connect these members with each other.

6 Claims, 3 Drawing Sheets

AUTOMATIC OPERATING APPARATUS FOR A FRICTION CLUTCH

BACKGROUND OF THE INVENTION

1. Field of the Invention

The present invention relates to an automatic clutch operating apparatus for performing the connection and disconnection of a friction clutch for an automotive transmission by an electronically-controlled motor-driven operation device through a hydraulic master cylinder and a hydraulic operating cylinder.

2. Prior Art

In a transmission of an automobile, it is known to utilize what is called an automatic hydraulic pressure generator, that is, a friction clutch is connected or disconnected by a hydraulic master cylinder operated by a computer-controlled motor. In such an automatic hydraulic pressure generator, an operation device for operating a hydraulic master cylinder by a motor is disclosed in DE-A No.4433824. In the constitution of the operation device, a worm is provided on an output shaft of the motor, and a piston rod of the hydraulic master cylinder is connected by a pin to a worm wheel meshing with the worm. According to such a constitution, rotation of the motor is reduced by the worm and the worm wheel and thereby torque is increased. Further, by utilizing the lever ratio due to the difference of the distance between the rotation center of the worm wheel and the connection point of the piston rod and the distance between the rotation center of the worm wheel and the meshing point of the worm and the worm wheel, the torque is increased and the rotary motion of the worm wheel is converted into the linear motion of the piston rod.

Also, the device is provided with a load accumulating means for quickly performing the disconnection of the clutch, in which means is utilized a compression spring device connected with the housinng at one end and with the worm wheel at the other end.

However, in order that the load may be accumulated and the accumulated load may work in the disconnecting direction of the piston rod in the operation device of DE-A No. 4433824, it is required that the mutual positional relation among the four points is strictly defined, namely the connecting point between the compression spring device and the housing, the connecting point between the device and the worm wheel, the rotation center of the worm wheel and the connecting point between worm wheel and the piston rod. As a result, the operation device has the weak points such that the design is very troublesome, the structure is complicated and the workability in assembling is inefficient, and the adjusting work is difficult.

SUMMARY OF THE INVENTION

An object of the invention is to provide an automatic operating apparatus for a friction clutch which is characterized in that the structure and the design are simple, the assembling is easy, and the adjusting work is made short.

The foregoing object is accomplished in an automatic operating apparatus for a friction clutch, comprising a motor rotatable forward and backward; a reduction means for reducing the rotation of said motor; a movement conversion means for converting the rotation of said motor into the axial movement of a piston rod; a hydraulic master cylinder including said piston rod for supplying the working oil to a hydraulic operating cylinder so as to compress a spring of a friction clutch through a clutch release mechanism so that the friction clutch may be disconnected; a load accumulating means provided on the housing of the apparatus so as to accumulate the loads due to the rotating force of said motor and the repulsive force of said clutch spring; a link mechanism provided on said piston rod so as to accumulate said load in said load accumulating means when said motor is rotated backward to connect said clutch and so as to release the accumulated load when said motor is rotated forward; and said link mechanism forming a toggle joint comprising a crank arm as an output part of said reduction means, said piston rod, a link rotatably connected with said load accumulating means through the first connecting portion, and the second connecting portion for connecting said crank arm, said piston rod and said link to be mutually rotatable.

The present invention as defined above is carried out in one embodiment, wherein said friction clutch is composed of a dry monoplate clutch with a diaphragm spring, said load accumulating means composed of a compression coil spring, and said reduction means composed of a worm gear and a worm wheel.

Also, the present invention as defined above is carried out in another embodiment, wherein said load accumulating means is provided with a stroke sensor most of which is buried therein.

DESCRIPTION OF THE PREFERRED EMBODIMENT

Figure 1:
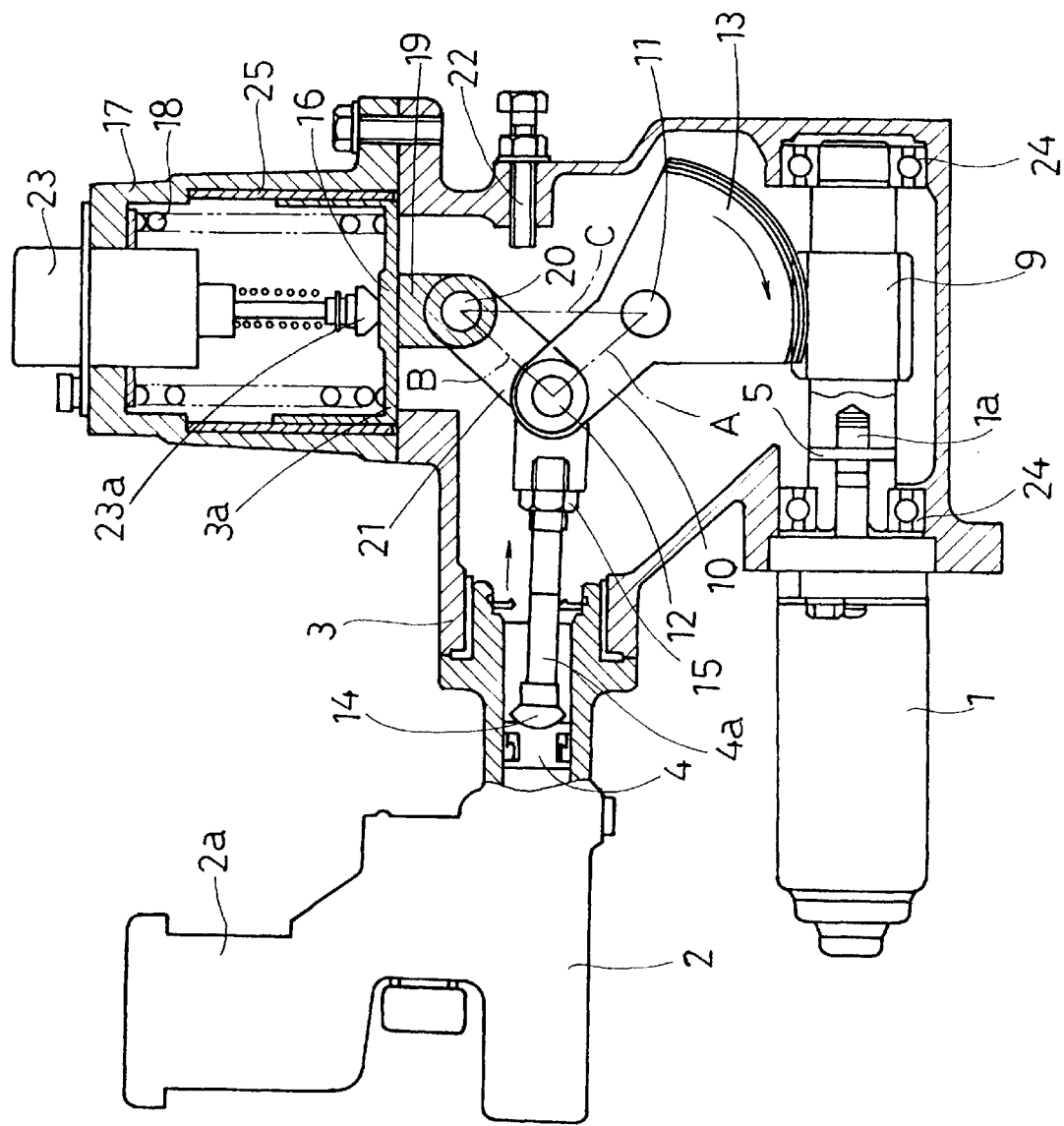
FIG. 1 is a sectional view of an automatic operating apparatus for a friction clutch in the condition of complete disconnection.

An embodiment of the present invention will be described in detail with reference to FIG. 1 hereinafter. The automatic operating apparatus for a friction clutch in the embodiment is constituted as shown in a sectional view of FIG. 1. In FIG. 1, the automatic operating apparatus for performing the connection and disconnection of the friction clutch (not shown) of an automotive transmission by computer control has a motor 1, a hydraulic master cylinder 2, and a reservoir 2a disposed on the upper side of the hydraulic master cylinder 2.

The motor 1 is rotatable forward and backward and is driven and controlled by a computer (not shown). The hydaulic master cylinder 2 has connection ports communicating with the pipings for an operating cylinder of a friction clutch (not shown).

With a piston 4 of the hydraulic master cylinder 2 is connected a piston rod 4a. When the piston rod 4a is moved to the forward position, shown in FIG. 1, by drive of the motor 1, the hydraulic master cylinder 2 generates hydraulic pressure and supplies it to the operating cylinder and the friction clutch is disconnected. In contrast with this, when the piston rod 4a is moved to the rearward position shown in FIG. 3, the hydraulic pressure is released and the friction clutch is connected.

A worm gear 9 is fitted on the outside of the motor shaft 1a of the motor 1 through a pin 5 and rotatably supported on the housing 3 through ball bearings 24 on both ends of the gear 9. Above the worm gear 9 a crank arm 10 is rotatably supported on the housing 3 through a fulcrum shaft 11. This crank arm 10 is rotatably connected with the tip portion of the piston rod 4a through a connecting pin 12 on one end and integrally provided with a sectorial worm wheel 13 meshing with the above-mentioned worm gear 9 on the other end. Incidentally, the worm gear 9 and the worm wheel 13 constitute a reduction mechanism for reducing the rotation of the motor 1 and transmitting the reduced rotation to the crank arm 10.

According to the above-described constitution, when the motor shaft 1a of the motor 1 rotates, the worm gear 9 is rotated through the pin 5. When the worm gear 9 is rotated, the crank arm 10 is rotated on the fulcrum shaft 11 because of the engagement of the worm gear 9 and the worm wheel 13. Accordingly, the position of the connecting pin 12 on the piston rod 4a is moved back and forth and the piston rod 4a is moved in the axial direction. That is, the connecting pin 12 and the piston rod 4a constitute a movement conversion mechanism by which the rotation of the crank arm 10 is converted into the axial movement of the piston 4.

Incidentally, according to the rotation of the crank arm 10 on the fulcrum 11, the position of the connecting pin 12 is not only moved back and forth but also moved up and down slightly. In order to absorb such a vertical movement, the front end of the piston rod 4a is connected with the piston 4 through a spherical bearing 14, so that it enables pitching of the rod 4a against the piston 4. Besides, the piston rod 4a is composed of two parts such as the piston 4 side and the pin 12 side, so that it enables adjustment of the whole length of the rod 4a by a stroke adjusting nut 15.

Next, on the upper side of the housing 3 is mounted a holder-seating portion 17 for containing a spring holder 16 in the form of a top-opened and bottom-closed cylinder. The holder 16 is made slidable along a bush 25 in the vertical direction (in the direction meeting at right angle to the moving direction of the piston 4). Between the inner surface of the top of the holder-seating portion 17 and the inner surface of the bottom of the spring holder 16 is made to stand a compression coil-spring 18, which is urging the spring holder 16 downward always. These spring holder 16 and compression coil-spring 18 function as a load accumulating means for accumulating the loads due to the backward rotating force of the motor 1 and the repulsive force of the friction clutch spring as a receding force for the piston rod 4a. Incidentally, the mounting surface of the housing 3 for the holder seating portion 17 serves as a stopper surface 3a for defining the lower limit of the spring holder 16. However, the mounting surface does not come in contact with the spring holder 16 in the normally used condition taking account of abrasion of the friction clutch. On the under surface of the bottom of the spring holder 16 is integrally formed an arm 19 projecting downward, which is rotatably connected with the upper end of the link 21 through a connecting pin 20. The lower end of the link 21 is rotatably connected with the connecting pin 12 as well as the piston rod 4a and the crank arm 10. Incidentally, the length of the link 21, namely the length between the connecting pins 12 and 20, is defined as same as the length between the fulcrum shaft 11 of the crank arm 10 and the connecting pin 12.

As described above, the link mechanism comprising the piston rod 4a, the crank arm 10, the link 21 and the connecting pins 12, 20 for connecting these members constitutes a toggle joint.

Figure 2:
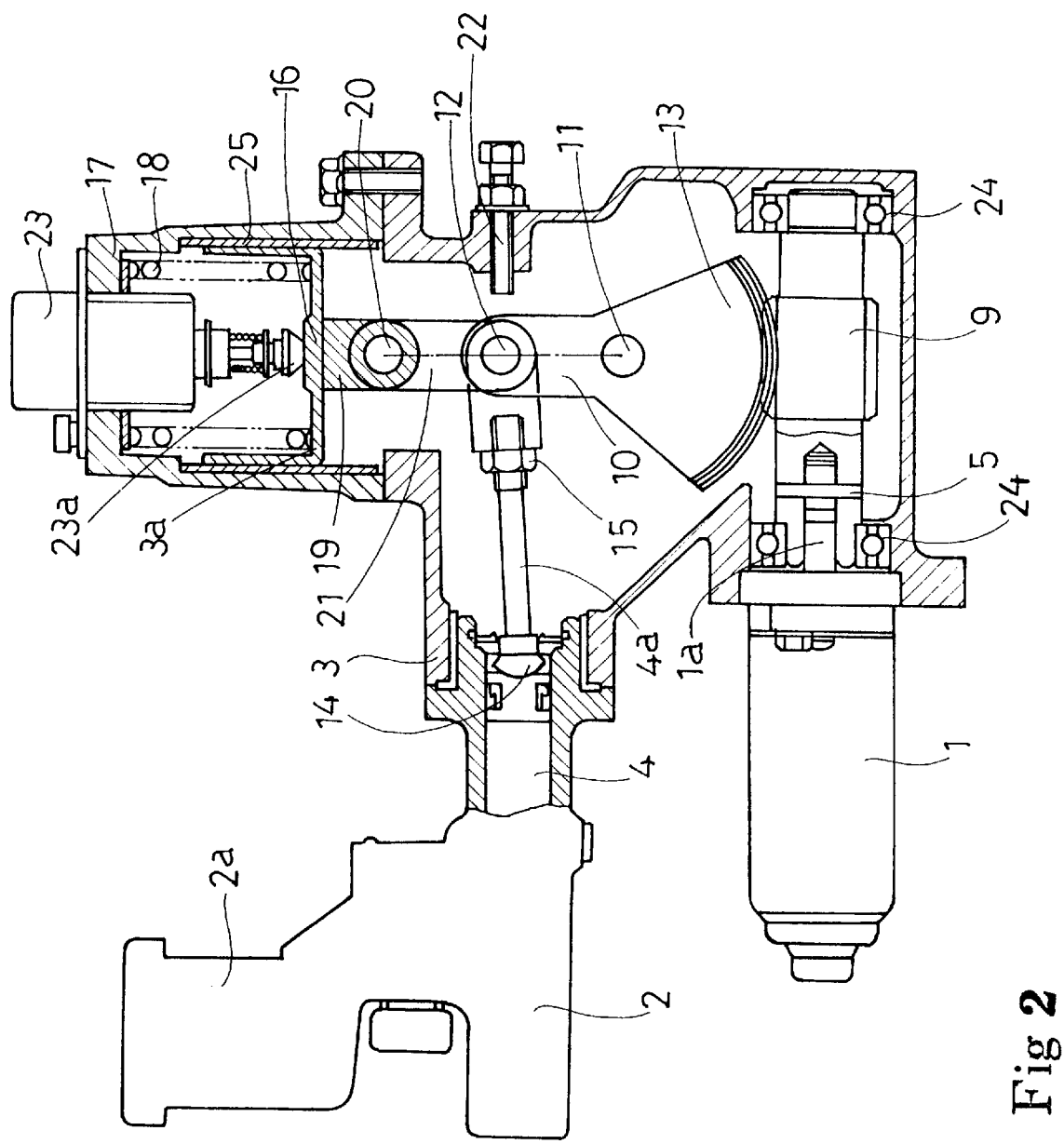
FIG. 2 is a sectional view, similar to FIG. 1, in the midway condition between disconnection and connection.
Figure 3:
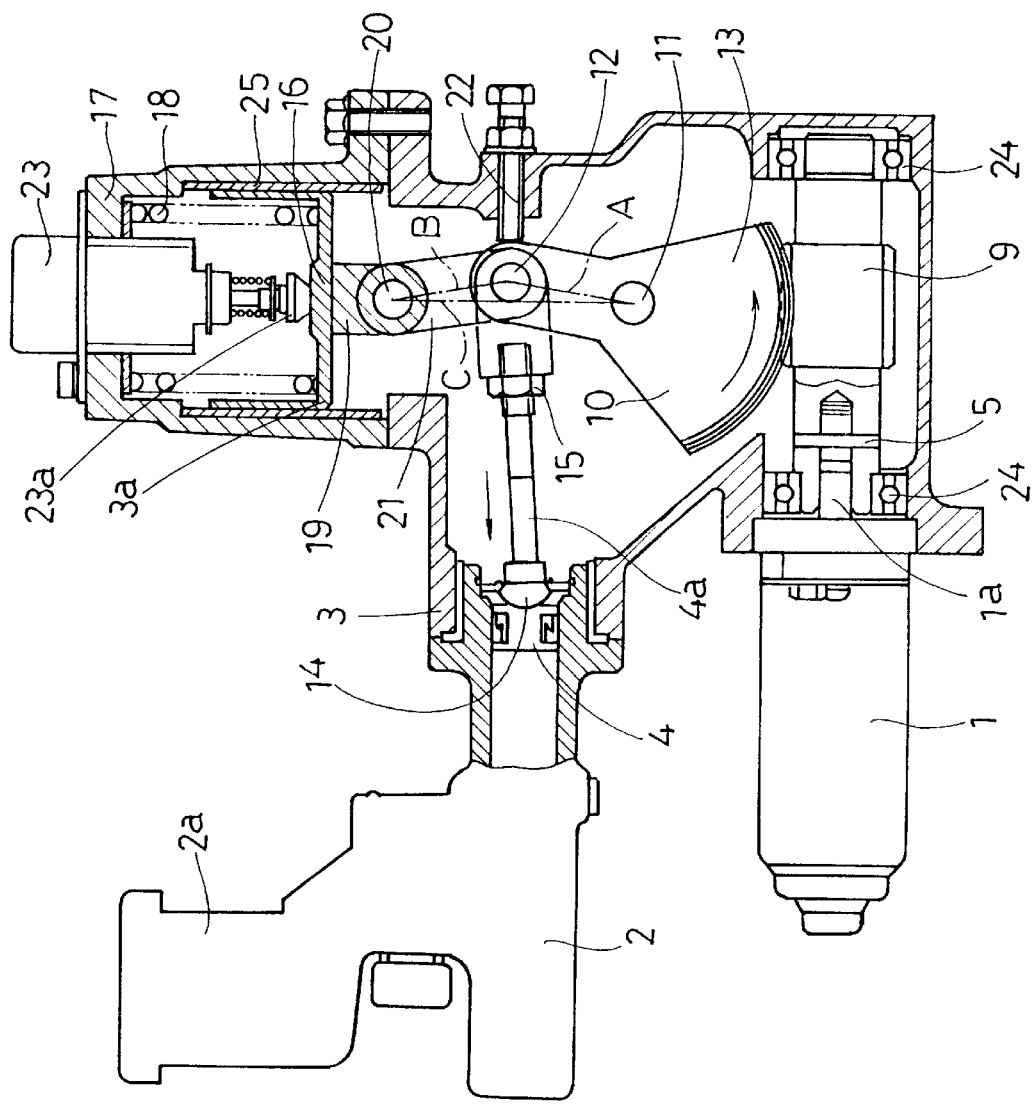
FIG. 3 is a sectional view, similar to FIG. 1, in the condition of connection.

Namely, this toggle joint realizes three conditions such as; first, as shown in FIG. 1, the line A tying the fulcrum shaft 11 of the crank arm 10 and the connecting pin 12 and the line B tying the connecting pin 12 and the connecting pin 20 are present at the left side of the line C tying the fulcrum shaft 11 and the connecting pin 20; second, as shown in FIG. 2, the line A and the line B are present on a straight line together with the line C and substantially perpendicular to the piston rod 4a; and third, as shown in FIG. 3, the line A and the line B is present at the right side of the line C.

In the first condition, the urging force of the compression coil spring 18 produces a component force in the direction to move the piston rod 4a forward (the left in the drawing); in the second condition, it does entirely no component force in the direction to move the piston rod 4a; and in the third condition, it does a component force in the direction to move the piston rod 4a backward (the right in the drawing). That is, the position of the connecting pin 12 changes the direction of the force of the compression coil-spring 18 to act on the piston rod 4a.

However, in the state of FIG. 1 even in the first conditon, no force acts on the piston rod 4a because the spring holder 16 is in a checked condition to move further downward by the stopper surface 3a.

In the condition as shown in FIG. 3 (the third condition), the outer surface of the crank arm 10 in the vicinity to the connecting pin 12 is in contact with a stopper bolt 22, which is resisting the urging force of the compression coil-spring. Accordingly, the piston rod 4a is held at the position where the connecting pin 12 is present at the right side slightly over the line C, as shown in FIG. 3. As a result, even when the motor is stopped, the urging force of the compression coil-spring 18 is held by the stopper bolt 22 and the receded piston rod 4a is in the released condition from the piston 4, that is, completely released from the friction clutch. Incidentally, the stopper bolt 22 is mounted on the housing 3 so as to face the piston rod 4a in the axial direction and the length of projection into the housing 3 or the position of the bolt tip is made adjustable.

Besides, on the top of the holder seating portion 17 is mounted a stroke sensor 23 of which the most part is positioned inside the holder seating portion 17. The detecting portion 23a of the stroke sensor 23 is adapted to be in contact with the center of the inner bottom surface of the spring holder 16 and to move with the vertical movement of the spring holder 16. According to the signals from this stroke sensor 23, the motor 1 is electronically controlled to stop and to rotate forward or backward and further to rotate during connection or disconnection of the friction clutch.

Incidentally, thr friction clutch of the transmission in this embodiment is composed of a dry monoplate clutch with a diaphragm spring.

In such a constitution as described above, in order to connect the friction clutch, the motor 1 is rotated backward from the condition of the piston 4 being in the advanced position as shown in FIG. 1, that is, the completely disconnected condition of the friction clutch.

When the motor 1 is rotated backward, the piston rod 4a is receded by the reduction means and the conversion means for axial movement as described above, and at the same time the spring holder 16 is moved upward in the holder seating portion 17 resisting and compressing the compression coil spring 18. Thereby, most of the rotating force of the motor 1 and the repulsive force of the friction-clutch spring is gradually accumulated in the compression coil spring 18.

When the piston rod 4a is receded to the position as shown in FIG. 2, the compression coil spring 18 comes to the most compressed condition (the second condition described above). When the piston rod 4a is further receced from the condition of FIG. 2, it comes to the third condition and the accumulated load in the compression coil spring 18 is released and the piston rod 4a is moved backward by the rotating force of the motor 1 and the force of the compression spring 18. However, when the piston rod 4a is moved backward from the condition of FIG. 2, the rotation of the motor 1 is stopped at once owing to the the stroke sensor 23 detecting that the spring holder 16 has reached to the limit of the upward stroke. Then, the piston rod 4a is checked to move further backward by the stopper bolt 22 and comes in the conditon of FIG. 3. Accordigly, the released amount of the load accumulated in the compression coil-spring 18 is small.

When the piston rod 4a has come to the condition of FIG. 3, the oil pressure in the master cylinder 2 is released and the friction clutch is completely connected.

Reversely, in order to disconnect the friction clutch from the condition of FIG. 3, the motor 1 is rotated forward. Then, in contrast with the connection, the piston rod 4a is moved forward resisting the repulsive force of the friction-clutch spring (not shown) and returned to the conditon of FIG. 2 and further to that of FIG. 1.

In this case, when the piston rod 4a is moved forward even a little from the condition of FIG. 2, it comes in the first condition described above and the accumulated load in the compression coil spring 18 is released at a stretch, producing a component force to move the piston rod 4a forward. Consequently, the piston rod 4a is quickly moved by a large force as a total of the thrust to be acted by the motor 1 throuth the crank arm 10 and the thrust of the compression coil spring 18. As a result, the generation of pressure in the hydraulic master cylinder 2 and the disconnection in the friction clutch can be quickly performed. p In the present invention as described above, the rotating force of the motor 1 during connection of the friction clutch and the repulsive force of the friction-clutch spring are accumulated in the compression coil spring 18. Owing to the utilization of this accumulated force for disconnnecting the friction clutch, the disconnection can be quickly performed.

More particularly in the present invention, the rotating force of the motor 1 and the repulsive force of the friction clutch spring are accumulated in the compression coil spring 18 through a toggle joint composed of a piston rod 4a, a crank arm 10, a link 21 and connecting pins 12, 20. According to such a constitution, it is possible to carry out solid accumulation of the load and rapid rease of it only by making the crank arm 10 and the link 21 present on a straight line and making the piston rod 4a substantially perpendicular to these members when the apparatus is in a midway condition between connection and disconnection, that is, the second condition as shown in FIG. 2. As a result, the apparatus has effects such that the structure and the design are simple, a motor of relatively small capacity is enough, the assembling is easy, and the adjusting work is made short.

Further, by using the compression coil spring 18 which can accumulate a large capacity of the load, most of the repulsive force of the friction clutch-spring and a part of the backward rotating force of the motor 1 can be effectively accumulated. The accumulated force can be effectively used for disconnection of the friction clutch.

Furthermore, the stroke sensor 23 to be used for stop and control of the forward and backward rotation of the motor 1 is mounted on the holder seating portion 17 so that most of the stroke sensor 23 may be positioned in the center space of the compression coil spring constituting the load accumulating means. Consequently, the entire structure of the apparatus comes to a compact form.

What is claimed is:

1. An automatic operating apparatus for a friction clutch, comprising a motor rotatable forward and backward;

a reduction means for reducing the rotation of said motor;

a movement conversion means converting the rotation of said motor into the axial movement of a piston rod of a hydraulic master cylinder so as to disconnect the frictional clutch;

a load accumulating means provided on the housing of the apparatus so as to accumulate the loads due to the rotating force of said motor;

a link mechanism provided on said piston rod so as to accumulate said load in said load accumulating means when said motor is rotated backward to connect said clutch and so as to release the accumulated load when said motor is rotated forward; and said link mechanism forming a toggle joint comprising a crank arm as an output part of said reduction means, said piston rod, a link rotatably connected with said load accumulating means through a first connecting portion, and a second connecting portion for connecting said, crank arm, said piston rod and said link to be mutually rotatable;

said crank arm and said link being positioned on a straight line, and said piston rod extending substantially perpendicular to the straight line, when the clutch is in a midway condition between connection and disconnection.

2. An automatic operating apparatus for a friction clutch as defined in claim 1, said load accumulating means composed of a compression coil spring, and said reduction means composed of a worm gear and a worm wheel.

3. An automatic operating apparatus for a friction clutch as defined in claim 2, wherein said load accumulating means is provided with a stroke sensor most of which is buried therein.

4. An automatic operating apparatus for a friction clutch as defined in claim 1, wherein said load accumulating means is provided with a stroke sensor most of which is buried therein.

5. An automatic operating apparatus for a friction clutch, comprising:

a motor rotatable forward and backward;

a reduction means for reducing the rotation of said motor;

a movement conversion means for converting the rotation of said motor into the axial movement of a piston rod between first and second positions, said movement conversion means comprising a body rotatably mounted on a shaft and connected between said motor and said piston rod;

a load accumulating means provided on the housing of the apparatus so as to accumulate the loads due to the rotating force of said motor;

a piston rod link provided on said piston rod and rotatably connected to said body by a first connecting pin; and, an accumulator link having a first end rotatably connected to said load accumulator by a second connecting pin and a second end rotatably connected to said piston rod link and said body by said first connecting pin;

wherein said first connecting pin is disposed to one side of a line between said second connecting pin and said shaft when said piston rod is in said first position and is disposed at least partially on the opposite side of said line when said piston rod is in said second position.

6. An automatic operating apparatus for a friction clutch, comprising:

a motor rotatable forward and backward;

a reduction means for reducing the rotation of said motor;

a movement conversion means for converting the rotation of said motor into the axial movement of a piston rod between first and second positions, said movement conversion means comprising a body rotatably mounted on a shaft and connected between said motor and said piston rod;

a load accumulating means provided on the housing of the apparatus so as to accumulate the loads due to the rotating force of said motor;

a piston rod link provided on said piston rod and rotatably connected to said body by a first connecting pin; and, an accumulator link having a first end rotatably connected to said load accumulator at a second connecting pin and a second end rotatably connected to said piston rod link and said body by said first connecting pin;

wherein said first connecting pin moves relative to said second connecting pin as said piston rod moves from said first position to said second position.

* * * * *